United States Patent [19]

Probst

[11] Patent Number: 4,763,871

[45] Date of Patent: Aug. 16, 1988

[54] MOUNTING BRACKET FOR OUTBOARD MOTOR

[75] Inventor: Harry C. Probst, Oshkosh, Wis.

[73] Assignee: Brunswick Corporation, Skokie, Ill.

[21] Appl. No.: 43,846

[22] Filed: Apr. 29, 1987

[51] Int. Cl.$^{4}$ .......... F16M 1/00

[52] U.S. Cl. .......... 248/640; 248/643

[58] Field of Search .......... 248/640, 641, 642, 643; 440/900

[56] References Cited

U.S. PATENT DOCUMENTS

| | | | |
|---|---|---|---|
| 1,450,732 | 4/1923 | Mueller | 248/231.7 |
| 2,890,845 | 6/1959 | Kiekhaefer | 248/643 |
| 3,025,028 | 3/1962 | Corbin et al. | 248/643 |
| 3,106,375 | 10/1963 | Donaldson | 248/643 |
| 3,598,348 | 8/1971 | Kiekhaefer | 440/900 X |
| 4,239,172 | 12/1980 | Spitzmesser | 248/641 |
| 4,524,942 | 6/1985 | Kueny | 248/643 |
| 4,545,559 | 10/1985 | Gilbreath | 440/900 X |

*Primary Examiner*—J. Franklin Foss
*Attorney, Agent, or Firm*—Andrus, Sceales, Starke & Sawall

[57] ABSTRACT

A bracket for mounting an outboard motor on a transom of a boat. The bracket has a pair of inverted U-shaped mounting members connected by a pivot pin such that the inside and outside legs of the mounting member extend downwardly over the transom. The outer legs of each mounting member are clamped into bearing engagement with the transom by means of an interconnecting thumbs screw assembly. The thumbs screw assembly includes a bolt member that extends through the outside leg and transom and an internally threaded hand operated screw member engaged on the end of the bolt member to provide a clamping arrangement with bolt-on safety and yet be able to easily be removed without wrenches for quick attachment and release of the bracket.

4 Claims, 1 Drawing Sheet

MOUNTING BRACKET FOR OUTBOARD MOTOR

BACKGROUND OF THE INVENTION

The present invention relates to brackets, and more particularly to a bracket for mounting an outboard motor on a transom of a boat.

Conventional outboard motor mounting brackets are constructed of inverted U-shaped members having an upper body portion which spans the transom and spaced inside and outside legs extending downwardly therefrom defining a transom-receiving opening therebetween. These U-shaped mounting brackets are then clamped on the transom by various clamping arrangements.

One arrangement for clamping mounting brackets on the transom is by means of a thumb screw which is threaded through the inside leg of the bracket and bears against the inside of the transom as shown in Kueny U.S. Pat. No. 4,524,942. Such brackets are held on the transom by the frictional engagement of the outer leg and the end of the thumb screw. Outboard motors with thumb screw mountings, however, have a tendency to gradually work their way upwardly during high speed operation until the thumb screws clear the transom and the motor is lost.

Other arrangements for mounting outboard motors on the transom of a boat have included various means of bolting the mounting brackets to the transom. Mounting assemblies of this type are disclosed in Conover U.S. Pat. No. 3,061,250, Kiekhaefer U.S. Pat. No. 3,598,348 and Hale et al U.S. Pat. No. 4,052,952. Such assemblies, however, require tools such as wrenches to allow for installation and removal.

U.S. Pat. No. 3,598,348 also shows a mounting arrangement which utilizes a hand operated clamp screw which extends through the inside leg and transom and includes a threaded end portion for engaging a threaded hole in the outside leg. Thus, a single connection is provided for each bracket which causes both legs to engage the transom by friction and by the clamp screw extending therethrough.

SUMMARY OF THE INVENTION

A bracket for mounting an outboard motor on a transom of a boat. The bracket includes an inverted U-shaped mounting member having an upper body portion and spaced inside and outside legs extending downwardly therefrom defining a transom receiving opening therebetween, and hand operated clamping means extending through the transom for releasably clamping the mounting member to the transom.

The clamping means includes a bolt member having a head portion for bearing engagement against the outside leg, a shank portion for extending through the outside leg and transom, and a threaded end portion projecting into the interior of the boat from the transom. The clamping means also includes a screw member having a hand grip portion and a shank portion connected thereto such that the shank portion includes an internally threaded bore for engaging the threaded end of the bolt member with the shank portion terminating in a shoulder for bearing engagement against the transom.

The present bracket retains the ability to be mounted on transoms of varying thicknesses while being more effective in holding the motor on the transom than conventional thumb screw mounting arrangements, and is simpler to mount than conventional brackets using reinforcing bolts. The present bracket thus provides attachment to the boat which is firm and will not loosen during operation, while allowing easy installation and removable without tools.

Other features and advantages of the invention will become apparent to those skilled in the art upon reviewing the following detailed description, the drawings, and the appended claims.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
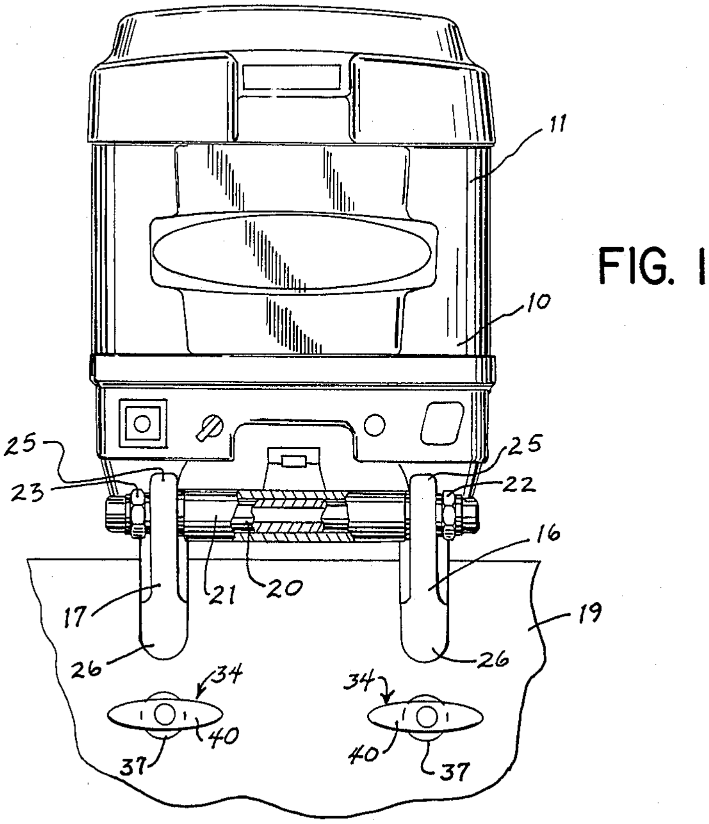
FIG. 1 is a front view in elevation of an outboard motor mounted on a transom by a mounting bracket constructed in accordance with the principles of the present invention.
Figure 2:
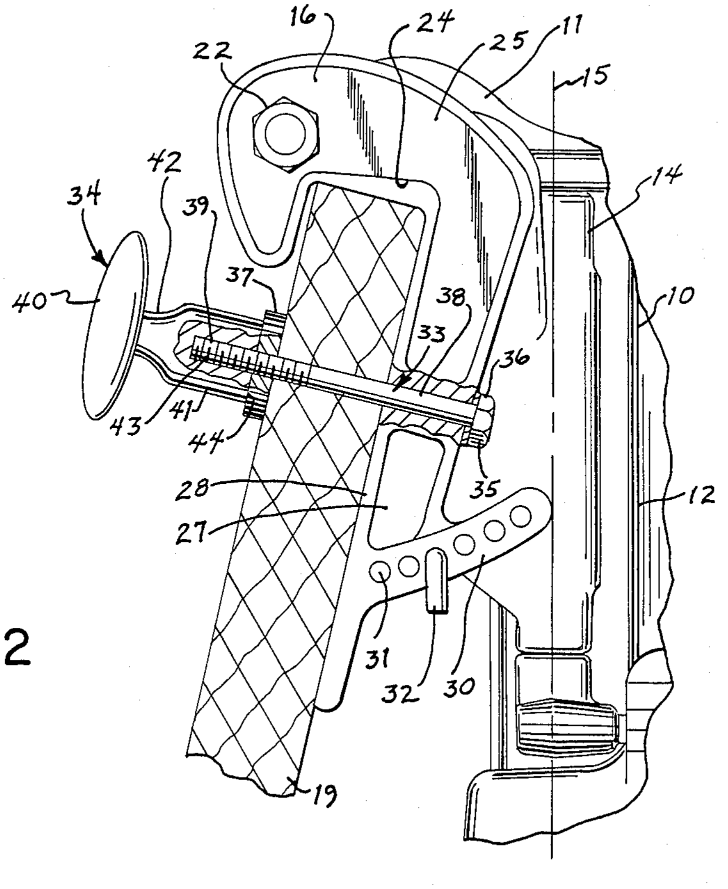
FIG. 2 is a fragmentary side view in elevation of the mounting bracket of FIG. 1 with parts broken away and in section showing the mounting bracket and motor in a clamped position.

Referring now to the drawings, FIGS. 1 and 2 illustrate an outboard motor 10 having an upper cowl 11 enclosing an engine (not shown), a drive shaft housing 12 and a lower unit carrying a propeller (not shown). Motor 10 is carried by a swivel bracket 14 for swivel movement about a vertical steering axis indicated generally by the numeral 15.

Two spaced inverted U-shaped clamp members or mounting members 16 and 17 are provided for clamping over transom 19 of a boat to removably mount outboard motor 10 thereon. Mounting members 16, 17 are interconnected by a pivot pin or tilt tube 20. Pivot pin 20 extends through a horizontally disposed sleeve portion 21 of swivel bracket 14. Clamp members 16, 17 are secured to pivot pin 20 by means of nuts 22, 23 threaded thereon at each end which secure members 16, 17 against the respective ends of sleeve portion 21.

Each inverted U-shaped mounting member 16, 17 has an upper body portion 25 with an integral inside and outside leg 26, 27 extending downwardly therefrom and defining a transom-receiving opening 24 therebetween. Outside leg 27 has an inner bearing surface 28 for bearing engagement against the outside surface of transom 19 when mounting members 16, 17 are clamped together thereon. Each outside leg 27 also has a rearwardly extending arm 30 thereon with spaced holes 31 therein. A tilt pin 32 is carried through the proper holes 31 to provide an abutment means for swivel bracket 14 resulting in proper trim for motor 10 during operation. Transom-receiving opening 24 may be of any desired width sufficient to enable the engine to be readily installed over transoms of any thickness within a desired range.

Means are provided for clamping members 16, 17 together onto transom 19. Such means are shown in FIGS. 1 and 2 as including a standard bolt member 33 extending through leg 27 and transom 19 with a hand operated screw member 34 threaded on the end of the bolt opposite bolt head 35. A washer 36 is mounted between head 35 and outside leg 27 and a second washer or spacer 37 is mounted between screw member 34 and transom 19.

Standard bolt member 33 includes head portion 35 for bearing engagement against outside leg 27, a shank portion 38 for extending through outside leg 27 and transom 19, and a threaded end portion 39 projecting into the interior of the boat from the inner surface of transom 19. Screw member 34 includes a hand grip portion 40 and a shank portion 41 connected thereto. Shank portion 41 includes an intermediate portion 42 of reduced cross section adjacent hand grip 40 which connects hand grip 40 and shank portion 41. Shank portion 41 includes an internally threaded bore 43 for engaging the threaded end 39 of bolt member 33, and shank portion 41 terminates in a shoulder 44 for bearing engagement against spacer 37 and transom 19 when clamped thereagainst. As shown, elongated hand grip portion 40 is fixedly secured to and generally perpendicular to shank portion 41.

The mounting bracket may include four of the above described and illustrated clamping means, namely, one at each upper end and lower end of mounting members 16, 17. Alternately, the lower ends of mounting bracket members 16, 17 may be inserted within the pockets of conventional bottom bolt adapters, similar to an arrangement such as that shown in Conover U.S. Pat. No. 3,061,250, in which case only two of the above described and illustrated clamping means, namely, one at each upper end of members 16, 17 need be used.

A bracket for mounting an outboard motor on the transom of a boat has been illustrated and described. The bracket is more effective in holding a motor on the transom than conventional thumb screw type mounting brackets, is simpler to mount than conventional brackets using reinforcing bolts, and allows easy installation and removal without tools.

Various modes of carrying out the invention are contemplated as being within the scope of the following claims particularly pointing out and distinctly claiming the subject matter which is regarded as the invention.

I claim:

1. A bracket for mounting an outboard motor on a transom of a boat, comprising:

a one piece inverted U-shaped mounting member having an upper body portion and integral spaced inside and outside legs extending downwardly therefrom defining a transom-receiving opening therebetween; and hand operated clamping means extending through the transom for releasably clamping the mounting member to the transom, said clamping means including a bolt member having a head portion for bearing engagement against said outside leg, a shank portion for extending through the outside leg and transom and a threaded forward end portion projecting forwardly from the transom, and a screw member having a handgrip portion and a shank portion connected thereto, said screw member shank portion including an internally threaded bore for engaging the threaded end of said bolt member and said screw member shank portion terminates in a shoulder for bearing engagement against the transom, without bearing against said inside leg, and without any other clamping means bearing against said inside leg.

2. The bracket of claim 1 further including a spacer disposed between the shoulder of said screw member shank portion and the transom.

3. The bracket of claim 1 wherein said screw member shank portion includes an intermediate portion of reduced cross section adjacent the handgrip which connects the handgrip and the screw member shank portion.

4. The bracket of claim 1 further including a washer disposed between the head portion of said bolt member and the mounting member.

* * * * *